(12) United States Patent
Mason

(10) Patent No.: US 8,121,894 B2
(45) Date of Patent: *Feb. 21, 2012

(54) EARLY-PAYMENT DISCOUNT FOR E-BILLING SYSTEM

(75) Inventor: Elaine Scott Mason, Stone Mountain, GA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/872,180

(22) Filed: Aug. 31, 2010

(65) Prior Publication Data

US 2010/0332309 A1 Dec. 30, 2010

Related U.S. Application Data

(63) Continuation of application No. 09/805,632, filed on Mar. 14, 2001, now Pat. No. 7,881,962.

(60) Provisional application No. 60/189,224, filed on Mar. 14, 2000.

(51) Int. Cl.
*G06Q 30/00* (2006.01)
*G06Q 40/00* (2006.01)
*H04M 15/00* (2006.01)

(52) U.S. Cl. .............................. 705/14.1; 705/34; 705/35

(58) Field of Classification Search ........................ None
See application file for complete search history.

(56) References Cited

U.S. PATENT DOCUMENTS

| | | |
|---|---|---|
| 5,603,025 A | 2/1997 | Tabb et al. |
| 5,699,528 A | 12/1997 | Hogan |
| 5,724,584 A | 3/1998 | Peters et al. |
| 5,787,416 A | 7/1998 | Tabb et al. |
| 5,832,460 A | 11/1998 | Bednar et al. |
| 5,870,473 A | 2/1999 | Boesch et al. |
| 5,884,284 A | 3/1999 | Peters et al. |
| 5,884,288 A | 3/1999 | Chang et al. |
| 5,903,881 A | 5/1999 | Schrader et al. |
| 5,909,485 A | 6/1999 | Martin et al. |
| 5,956,700 A | 9/1999 | Landry |
| 5,963,925 A | 10/1999 | Kolling et al. |
| 5,970,476 A | 10/1999 | Fahey |
| 5,978,780 A | 11/1999 | Watson |
| 5,991,750 A | 11/1999 | Watson |
| 5,995,946 A | 11/1999 | Auzenne et al. |
| 6,047,268 A | 4/2000 | Bartoli et al. |
| 6,052,671 A | 4/2000 | Crooks et al. |
| 6,067,525 A | 5/2000 | Johnson et al. |
| 6,289,322 B1 * | 9/2001 | Kitchen et al. .................. 705/40 |
| 6,496,744 B1 | 12/2002 | Cook |

(Continued)

FOREIGN PATENT DOCUMENTS

WO WO/98/58339 12/1998

(Continued)

OTHER PUBLICATIONS

Gafney, Leo. Practical Merchandising Math. John Wiley & Sons. 1996. pp. 12-16 and 19-20.*

(Continued)

*Primary Examiner* — Jason M Borlinghaus

(57) ABSTRACT

An Early Payment Discount (EPD) mechanism that enables customers to automatically receive an early payment discount for paying their invoice electronically, e.g., via electronic funds transfer (EFT), through an e-Billing system within a designated number of days from on-line invoice post date.

20 Claims, 7 Drawing Sheets

U.S. PATENT DOCUMENTS

| | | |
|---|---|---|
| 6,616,458 B1 | 9/2003 | Walker et al. |
| 2001/0018673 A1 | 8/2001 | Goldband et al. |
| 2001/0037297 A1 | 11/2001 | McNair |
| 2001/0047347 A1 | 11/2001 | Perell et al. |
| 2002/0026410 A1 | 2/2002 | Woloshin et al. |
| 2002/0131561 A1 | 9/2002 | Gifford et al. |

FOREIGN PATENT DOCUMENTS

| | | |
|---|---|---|
| WO | WO/99/13421 | 3/1999 |

OTHER PUBLICATIONS

U.S. Appl. No. 10/831,022, filed Apr. 23, 2004, Ganesan, et al.

Hayes, Heather. "E-forms Learn New Language". Federal Computer Week. Falls Church, Feb. 21, 2000. vol. 14, Iss. 4; p. 32. Retrieved from ProQuest Nov. 30, 2005. (3 pages).

"Accounting Software 101," by Jan Smith et. al., PC-Computing, v5, n2, p. 252(6). Feb. 1992.

"Three Ways to Get Your Customers to Pay Faster," Anonymous. Business Owner v23n5 pp. 17 Sep./Oct. 1999.

"How to capture EDI benefits without losing float," by Louis West. Corporate Cash Flow, v16n11 pp. 62-64, Nov. 1995.

Michaelas, Nicos; Chittenden, Francis; Poutziouris, Pannikkos. "Pay and Save", Accountancy. Londo, Jun. 1999. vol. 123, Iss. 1270; p. 92. Retrieved from ProQuest Feb. 9, 2006. (2 pages).

Electronic Bill Payment/Presentment Business Practices, Council for Electronic Billing and Payment of the NACHA, Jun. 4, 1999, Edition 1.0, pp. 1-28, entire document.

Betta, M., Start Paying Invoices Once, Not Twice, Computerworld, vol. 27, No. 14, Apr. 5, 1993, p. 59, entire document.

Checkfree, First Data and Microsoft Join Forces to Accelerate electronic Billing and Payment Use, Feb. 15, 2000, www.checkfree.com/newsresults/1,5872,649,00.html, 6 pages, entire document.

Intelligent Enterprise, 2, 4, 8(1), Mar. 9, 1999, 2 pages, entire document.

* cited by examiner

Early Payment Discount — 425

Take advantage of the Early Payment Discount Offer by paying today. Simply review the payment information below and click Pay Now to receive your 2% discount. If you prefer to pay at a later date click Schedule Payment. — 432

*430*

| | |
|---|---|
| Bank Account | Bank 1 Name - Account Number ▼ |
| Invoice Date | 12/25/1998 |
| Invoice Number | 12345678 |
| Total Current Charges | $1,000.00 |
| Early Payment Discount* | $20.00 — 437 |
| Total Amount Due | $900.00 — 439 |

— 435

[440]  [445]

447 — *Early Payment Discount is calculated as 2% of Total Current Charges. In order to receive your Early Payment Discount you must make payment electronically by <<<Insert Date>>> and pay the full Total Amount Due. Customers with outstanding balances do not qualify. — 449

ELECTRONIC PAYMENT CONFIRMATION — 450

The following payment is scheduled: — 460

| | |
|---|---|
| Confirmation Number | 101500001285 |
| Bank Account | Bank 1 - Account Number 1 |
| Invoice Date | 12/25/1998 |
| Invoice Number | 64653495 |
| Total Current Charges | $1,000.00 |
| Early Payment Discount | $   20.00 CR — 462 |
| Total Amount Due | $  980.00 |
| Payment Amount | $  980.00 — 464 |
| Payment Date | 12/25/1998 |
| Confirmation Date | 12/25/1998, 9:46 AM |

Payments which are initiated after 12:30 PM ET will be processed the following business day. Funds will be deducted from your account on the business day following the date your payment is processed.

In addition to the invoice listed above, you are responsible for paying any outstanding electronic or paper-based invoices.

```
┌─────────────────────────────────────────────────────────────────┐
│ EDIT ELECTRONIC INVOICE PAYMENT                                 │
├─────────────────────────────────────────────────────────────────┤
│ 🛈                                                              │
├─────────────────────────────────────────────────────────────────┤
```

Take advantage of the Early Payment Discount Offer by scheduling your payment for no later than <<<Insert Date>>>.　　　　　　　　　　　　　　　　 481
　　　　　　　　　　　　484
Complete the information below and click Continue.
　　　　　　　　　　　　480

| | |
|---|---|
| Bank Account | Bank 1 - Account Number 1 ▼ |
| Invoice Date | 12/25/1998 |
| Invoice Number | 54653495 |
| Current Charges | $1,000.00 |
| Outstanding Charges | $    0.00 |
| Early Payment Discount | $   20.00 |
| Total Amount Due | $  980.00 |
| Payment Amount | $  980.00 　 486 |
| Payment Date | 12/25/1998 ▼ |

487 ⟶ [Continue] [Cancel]

Payments which are initiated after 12:30 PM ET will be processed the following business day. Funds will be deducted from your account on the business day following the date your payment is processed.

In addition to the invoice listed above, you are responsible for paying any outstanding electronic or paper-based invoices.

```
┌─────────────────────────────────────────────────────────────────┐
│ ELECTRONIC INVOICE PAYMENT                                      │
├─────────────────────────────────────────────────────────────────┤
│ 🛈                                                              │
└─────────────────────────────────────────────────────────────────┘
```

491 { You have set the payment date greater than 10 days from the day the invoice was posted. In order to take advantage of the Early Payment Discount Offer you will need to schedule payment prior to <<<Insert Date>>>. Please hit the back arrow on your browser if you would like to change the payment date now.
　　　　　　　　　　　　　　　　　　　　　　　　　492
If you want to leave payment terms as reflected below click Submit.
　　　　　　　　484

| | |
|---|---|
| Bank Account | Bank 1 - Account Number 1 |
| Invoice Date | 09/25/1998 |
| Invoice Number | 54653495 |
| Current Charges | $1,000.00　437 |
| Early Payment Discount | $    0.00 |
| Total Amount Due | $1,000.00 |
| Payment Amount | $1,000.00 |
| Payment Date | 494　12/31/1998 |

[Submit] [Cancel]

FIG. 4E ically, e.g., via electronic funds transfer, EFT, through an e-Billing system within a designated number of days from receipt of invoice. The designated number of days is determined by the business case and may change periodically, e.g., every six months. Any EPD discount provided is based on the current invoice charges. The EP percentage discount is automatically calculated depending upon the date that the EFT payment is made. EFT account payment screens will automatically display the percentage discounts depending and the time period of EPD availability. As an example, on-line customers may receive a first discount amount, e.g., of two percent (2%) for EFT payment within a first set time period, e.g., five (5) days, of receiving the invoice, or, a second smaller discount amount, e.g., one percent (1%), for EFT payment within a second set time period, e.g., ten (10) days, of receiving the invoice. It is the case that early payment discounts do not apply to past due amounts, and preferably apply only if the user submits payment for the full amount. In the preferred embodiment, the EPD mechanism implements a rate table representing the two tiers (e.g., 2% and 1%). Each month, when the invoices are received from the enterprise billing system, a calculation is performed based on the eligibility criteria. If the criteria are met, that invoice appears online with a 'discounted' or 'adjusted' total amount due for each tier. The payment section of the application displays the amount of the discount and the date it should be paid in order for the customer to receive the discount.

EARLY-PAYMENT DISCOUNT FOR E-BILLING SYSTEM

CROSS-REFERENCES TO RELATED APPLICATIONS

This application is a continuation of U.S. patent application Ser. No. 09/805,632, filed Mar. 14, 2001, which claims the benefit of the earlier filing date of U.S. Provisional Patent Application Ser. No. 60/189,224, filed Mar. 14, 2000, entitled "Early-Payment Discount for E-billing System"; the entireties of which are incorporated herein by reference.

BACKGROUND OF THE INVENTION

1. Field of the Invention

The present invention relates to e-commerce customer-support services, and particularly, to enhanced features for a web-based billing system tool enabling customers to pay their invoices relating to telecommunications products and services on-line.

2. Discussion of the Background

Currently, there is no telecommunications enterprise or vendor providing telecommunications services that provide a fully integrated communications offering on the Internet with comprehensive product and services information, including electronic billing analysis and interactive customer support. In the area of billing for telecommunications products and services, telecommunications service enterprises provide capabilities for "on-line" electronic funds transfer (EFT) or public switched telephone network (PSTN) dial-up credit card payment of their invoices.

Existing comprehensive world-wide-web/Internet-based invoicing and payment systems (hereinafter "e-Billing") enables customers to easily receive and analyze their invoices, and, in addition, enable customers to pay their invoices, electronically via electronic funds transfer. This "e-Billing" system includes a comprehensive software and system infrastructure that provides a variety of tools for enabling customers of telecom companies to receive, analyze and pay their invoices by a variety of methods, via a single comprehensive interface.

It is becoming increasingly desirable for telecommunications enterprise customers to pay their invoices "on-line", due to the ease of processing and cost reduction from the view point of the billing enterprise. However, many customers have been resistant to conduct any e-business transactions on-line and are unwilling to pay their invoices electronically, for a variety of reasons.

Thus, to promote on-line customer invoice payment, it would be highly desirable to employ an Early Payment Discount ("EPD") mechanism enabling providing an incentive for customers to receive an early payment discount on invoice current charges for paying their invoice electronically through the E-Billing service within a designated number of days from receipt of their invoice.

SUMMARY OF THE INVENTION

The present invention addresses the above stated needs by providing an early payment discount mechanism for an e-billing system that provides an incentive for customer's early payment of current invoice charges.

According to one aspect of the invention, there is provided an Early Payment Discounts ("EPD") mechanism that enables customers to automatically receive an early payment discount for paying their invoice electronically, e.g., via elec- Further to this, multiple discount periods may be offered with the percentage of discount varying by the date payment is made.

Advantageously, the EPD system of the invention reduces the enterprises "Days Receivable Outstanding" thus, providing significant savings the telecommunications enterprise.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is discussed with respect to an Internet-based billing system, it is recognized that the present invention has applicability to any packet switched network.

Figure 1:
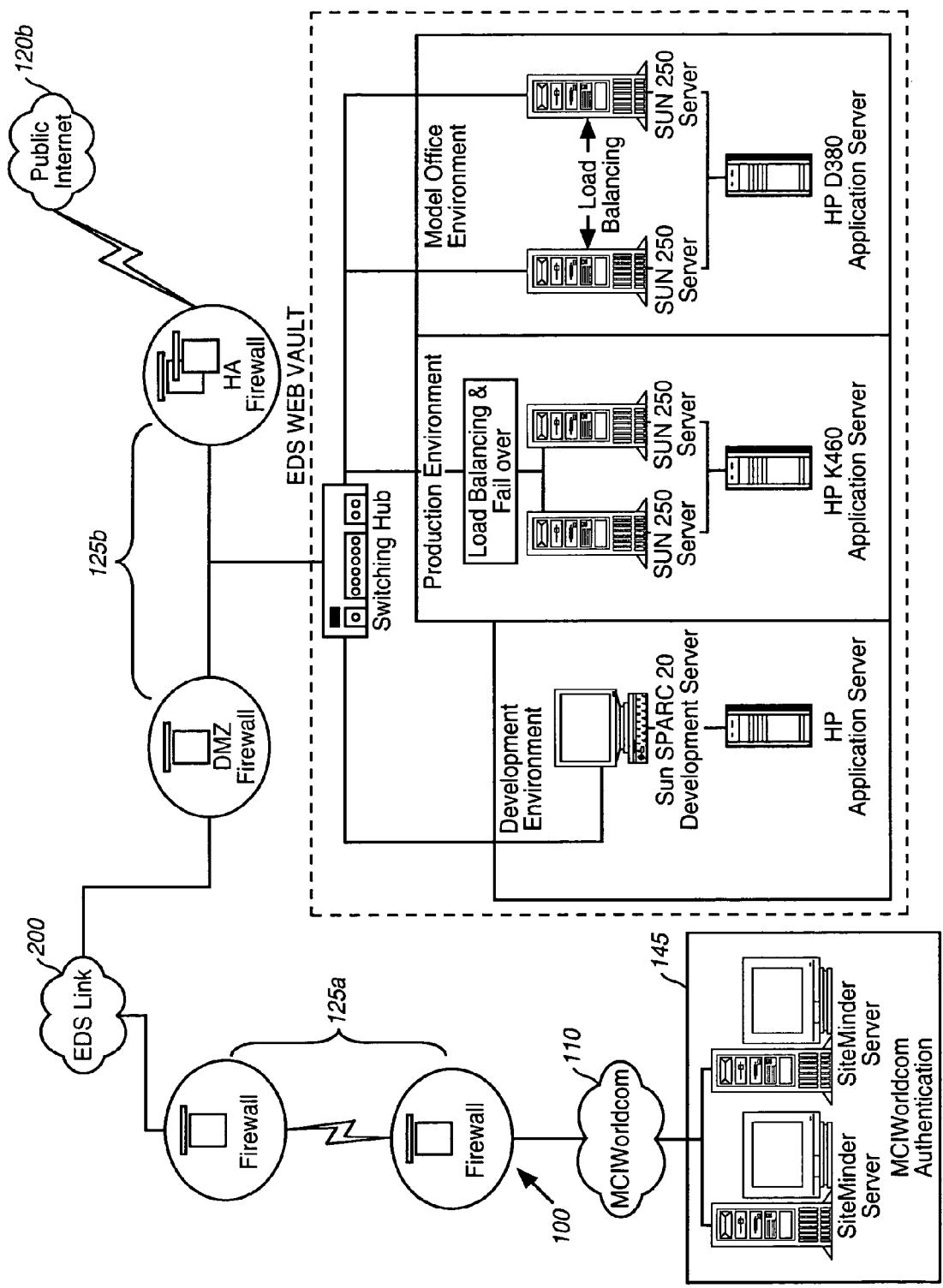
FIG. 1 is a diagram of an e-billing system architecture employing an early-payment discount (EPD) mechanism, in accordance with an embodiment of the present invention.

As shown in FIG. 1, there is depicted a physical hardware architecture of an exemplary e-billing system 100 (e.g., the MCIWorldcom™ Interact system). As shown in FIG. 1, there is provided a billing system represented as cloud 110. Relating specifically to e-Billing, a link via a double firewall 125a is provided to interface the billing system 100 with a third-party vendor electronic bill statement and presentment system 200 that functions to generate and present on-line billing invoices for customers of the telecommunications enterprise over the Internet via double firewall 125b. In operation, a file including a customers billing/invoice data is provided by the Billing system (e.g., accounts receivable department) to the third-party system 200 where web-pages including corresponding versions of the customer invoices are generated and posted on-line. Customers initially do not have access to the web based invoices. Instead, the on-line invoices are available to the enterprise audit department which checks the invoices for format compliance and billing total amount accuracy. As soon as the on-line version of the invoices are approved by the audit department, they are flagged as available on-line and the third party system 200 notifies the customer and posts the invoices on-line for the customer access. Via public Internet 120b access through the MCI™ "Interact" web server portal to the suite of web-based applications including the e-billing application (not shown), the customer's may pay their invoices.

Figure 2:
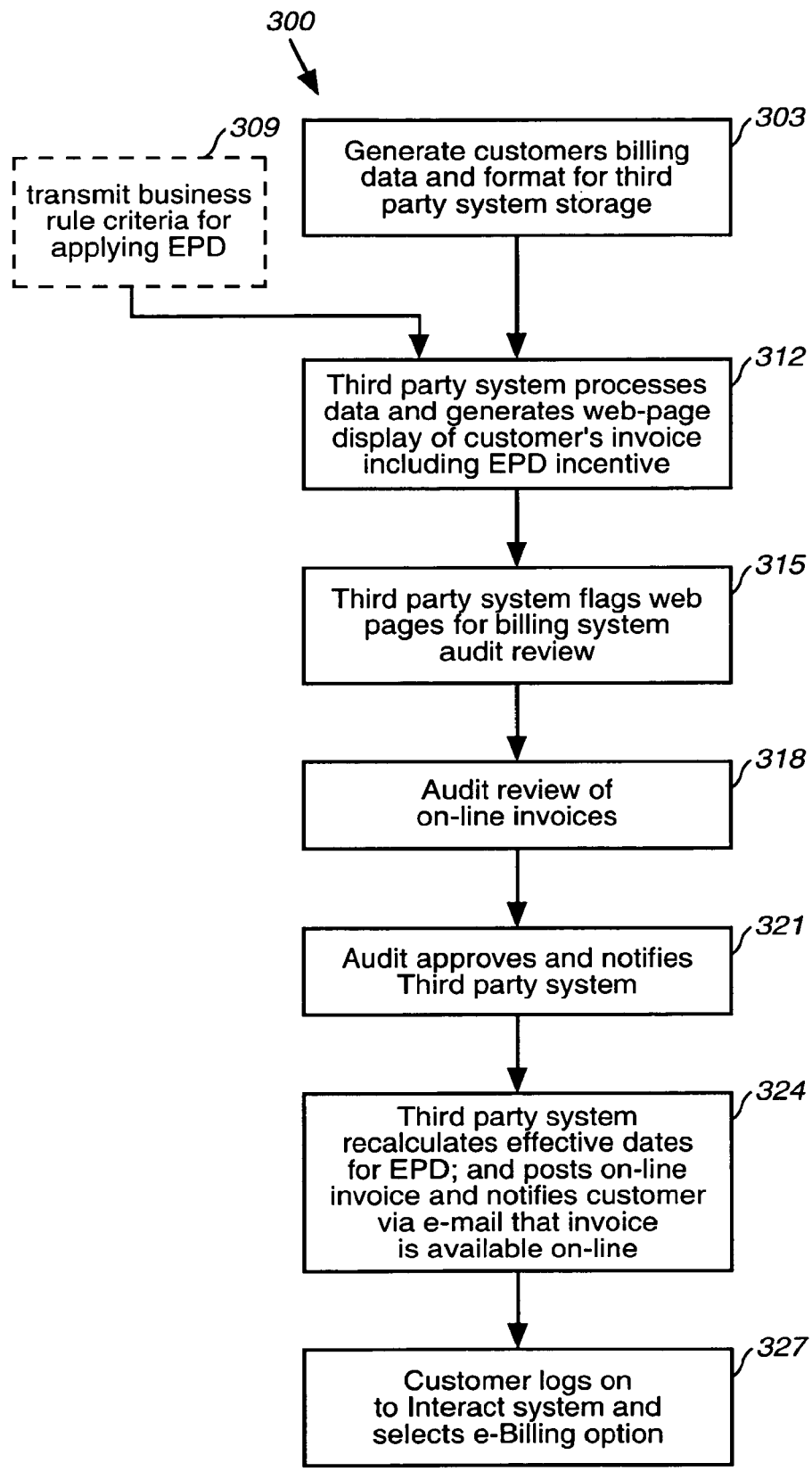
FIG. 2 is a diagram of a process for generating EPD incentives for inclusion in on-line customer invoices, according to an embodiment of the present invention.
Figure 3A:
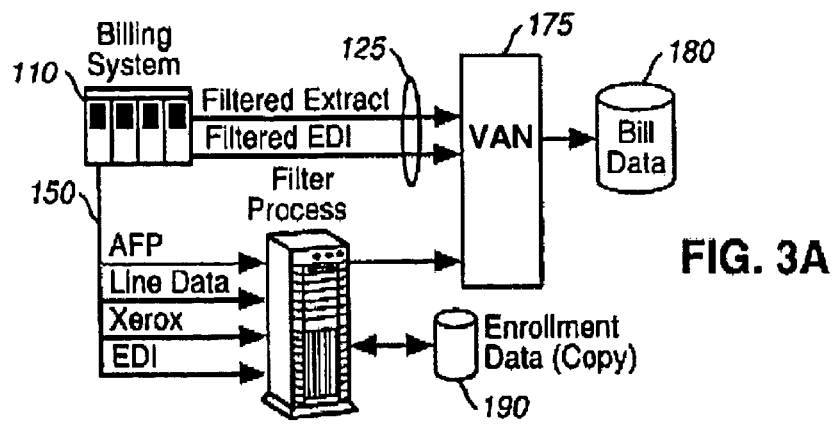
FIGS. 3(*a*)-3(*c*) are diagrams of an example electronic bill statement and presentment system 200 employed by a third-party for generating on-line invoices having the EPD incentive, according to an embodiment of the present invention.
Figure 3B:
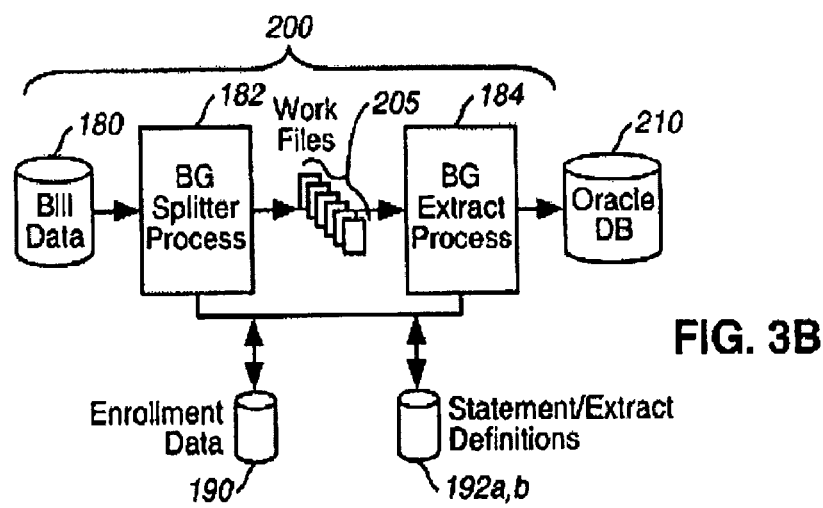
Figure 3C:
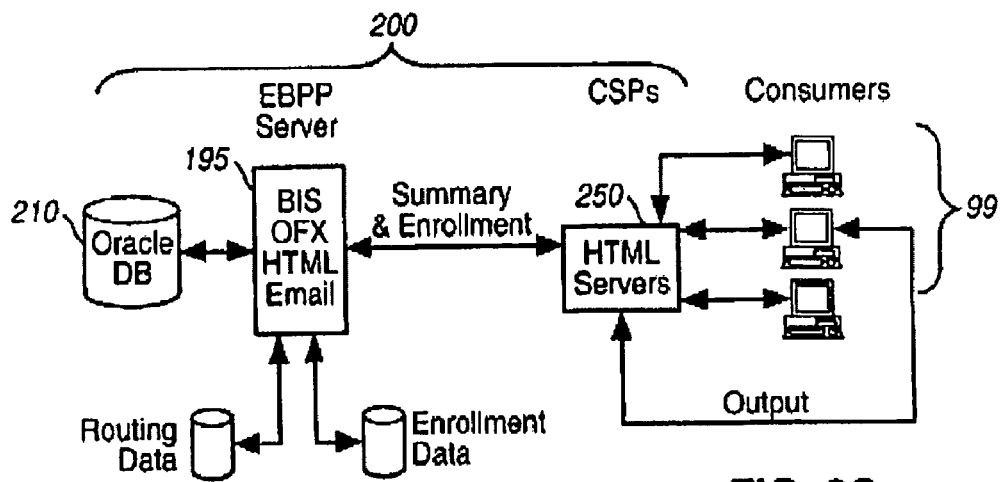

FIGS. 2, 3(a)-3(c) particularly depict a data flow summary 300 and the invoice generation process involving the billing enterprise and the third-party electronic bill statement and presentment system for generating invoices and applying EPD discount according to the invention. As shown in FIG. 2, a first step 303 depicts generally, the step of providing the customer invoice data to the third-party electronic billing and presentment system 200 (FIG. 1). This information may be provided in flat format files to the third-party system and may comprise softcopy images of the customers paper invoices. Preferably, a process is performed whereby data is extracted from the enterprise legacy billing system 110 and transported to a common data store maintained by the third party system 200. As depicted in FIG. 3(a), there are two methods in which a billing system 110 may provide bill data to the third party e-billing payment and presentment system 200: by either providing a filtered extract 125 including only those bills destined for electronic delivery, or, they can provide a non-filtered extract 150 that includes all bills. In the latter scenario, the third-party system is required to match bill data against an enrollment store 190 as depicted in FIG. 3(a). There are several formats that the billing system may provide to the third-party system 200 including, but not limited to: AFP (IBM's™ Advanced format printing), Line Data, XEROX™ Metacode, and electronic data interchange (EDI) electronic file format. Once the extract has been completed by the billing system 110, the data is then routed to the third-party system 200 for processing. Implementing known techniques, a dedicated communication circuit may be used to route this data to the third party system for high volume billers, or a Value Added Network (VAN) 175 may be implemented as well for receiving the data and routing data to the billing database. Once the data has been sent to the VAN, the third-party system 200 sweeps the assigned VAN mailbox on a regular basis to obtain bill data and load it to an interim data store 180 on an electronic bill presentment and payment ("EBPP") server 195, as shown in FIG. 3(c). As further shown in FIG. 2, at step 309, business rule criteria for applying EPD to the invoice billing data for customers is transmitted to the third-party system for application to the invoices. As will be explained in greater detail herein, this billing data includes the discount period(s) and one or more levels of discount percentages for the billing period. Then, as shown in FIG. 2, there is the step performed by the third-party system of processing the extracted customer data and generating invoices for on-line presentation. This step is depicted in greater detail in FIGS. 3(b) and 3(c).

Referring to FIG. 3(b), once customer invoice data has been loaded to the interim data store 180 on the EBPP server 195, it is parsed for loading into a database, e.g., ORACLE™ database 210. This process involves several steps, including known processes such as facilitated by BLUEGILL™ software available from BlueGill Technologies, Inc, the content and disclosure of which is incorporated by reference herein. First, the raw input file is moved to a working directory that is monitored by a continuously running splitter process 182 in a server. Once the file arrives in this directory, the splitter 182 automatically begins the process of splitting the file into distinct statements, generating a single working file for each. Also during this process, the splitter parses each statement for key information such as the account number, invoice amount. The splitter process only generates a working file 205 for those statements whose account number matches with an account in the enrollment data store 190. This step assumes that a statement definition file 192a and an extract definition file 192b have been previously created and loaded to the server. These files 192a,b define how to locate key elements within the statement, and which elements will be extracted and loaded as a discreet bill on the server. Second, the working files 205 are input to a second working directory that is monitored by an extract process 184 continuously running on the server. The extract process begins processing statements as soon as the working files 205 arrive. The extract process parses through each work file (statement) based on the location of information defined in the extract definition, and extracts key elements that were defined in the statement definition. This information is then compressed into a Binary large object (BLOB) (except for key fields such as account and statement date) and loaded to the ORACLE™ database 210 as a distinct statement record to be later accessed via a web-based server interface. Once all working files 205 have been processed, the process repeats with the next extract from the billing enterprise.

The actual generation of the final on-line (HTML) invoice is now described with respect to FIG. 3(c). As illustrated in FIG. 3(c), the third-party EBPP server 195 hosts the ORACLE™ database 210 that warehouses all customer invoice data in a format accessible by the web-server interface. The stored bills include all necessary information to generate a complete invoice for the customer including bill summary, bill detail, and all data elements originally defined in the statement definition. A method is additionally invoked to apply business rules for determining whether the customer may receive an EPD discount, and if determined that a EPD discount is to be applied, generated additional data including the discount amount, and the discount availability period. The primary output mechanism is a web-server interface which services requests from various processes and acts as the sentry between requesting processes, e.g., an HTML server 250 and the ORACLE™ database 210. Compressed customer invoice data in the database is instantiated only on request via the interface which serves requests from a web application, or alternately from scheduled processes from a Consolidated Service Provider (CSP) that facilitates the transport of information.

Before bill data is presented to the customer, HTML presentation templates are implemented which serves as the "frame" within which invoice data will be presented. The invoice data includes the EPD discount data, including the amount of the discount and the discount availability period, for presentment on the on-line customer invoice.

Returning now to FIG. 2, as indicated at step 315, prior to making the on-line invoice available to the customer, the third party system informs the audit department of the billing system that the web pages containing invoice frames are available for audit/review. Audit review of the generated on-line invoice is depicted at step 318 and is typically performed manually to ensure that the generated on-line invoice conforms to the original paper invoice. At this step, a verification is made that the EPD data is correctly applied for that customer and that the EPD amount and expiration dates are correctly indicated.

Then, at step 321, if the auditing department approves of the on-line HTML version of the invoice, the third party system is notified at step 324. If an error is detected in the invoice, for example, an incorrect total invoice amount, the audit department assigns that invoice a severity code, and informs the third-party system accordingly. Based on the severity code, the third-party system will regenerate the HTML invoice, for further audit approval, e.g., for high severity codes, or correct the error and continue with the posting of the invoice to the customer.

Assuming that the audit process has approved the generated on-line invoice, and given that the audit process may take a day or more to process, the third-party system automatically recalculates the discount availability periods for accuracy at step 324, and generates a notification via e-mail that the customer's invoice is now available on-line for the customer. Preferably, the date of email notice of statement posting must be stored for calculation of start and end dates and, discounts are to be stored until the next statement.

Referring back to FIG. 3(c), once the approved HTML templates are loaded, the EBPP server 195 processes requests using the web application that has been developed.

As customers 99 access the Interact web site via computer devices 99 executing a web-browser (e.g., preferably including Netscape or Internet Explorer v4.0 or higher), they may first authenticate themselves by entering their User ID and password. E-billing system authorizations are based on customer profile information maintained by the system and an Interact Universal Authentication ("UA") system which implements a UA server 145 (FIG. 1) for providing a real-time interface with the e-Billing system 100. After successful log-in and access to the e-billing system, the HTML web server receives a customer request and passes it to the web application, which in turn generates a request to the interface. The interface receives the request, processes the authentication against the enrollment store, and returns a response to the web application. The web application generates the resulting HTML using the pre-built templates and serves the response to the customer. This process is essentially the same for all requests, whether they be for authentication, presentment of invoice summary, invoice detail including applicable EPD discount, or otherwise. However, as requests for invoice data are processed, the content is instantiated from the database 210 by the Interface.

Finally, as depicted in FIG. 2, at step 327, a customer logs in to the Interact system web-site and selects the e-billing option. As the request is made from the customer, the EPD data is calculated, and the invoice data and EPD data, is populated within the HTML template, and the entire HTML page is returned to the customer 99 for viewing via HTML web server 250 (FIG. 3(c)). The templates are built for web-direct delivery.

In the preferred embodiment, any EPD discount provided is based on the current invoice charges. The invoice screens will thus, automatically calculate the percentage discount depending upon the date that the EFT payment is made. As an example, on-line customers may receive a first discount amount, e.g., of two percent (2%) for EFT payment within a first set time period, e.g., five (5) days, of receiving the invoice, or, a second smaller discount amount, e.g., one percent (1%), for EFT payment within a second set time period, e.g., ten (10) days, of receiving the invoice. It is understood that the enterprise marketing team preferably determines the discount terms including the designated number of days and these terms are determined by the business case and may change periodically, e.g., every six months. It is the case that early payment discounts do not apply to past due amounts, and preferably apply only if the user submits payment for the full amount. In the preferred embodiment, the EPD mechanism employed by the third-party billing system implements a rate table (not shown) representing the two tiers (e.g., 2% and 1%). Each month, when the invoices are received from the enterprise billing system 100, a calculation is performed based on the eligibility criteria. If the criteria is met, that invoice appears online with a 'discounted' or 'adjusted' total amount due for each tier. The payment section of the application displays the amount of the discount and the date it should be paid in order for the customer to receive the discount.

Figure 4A:
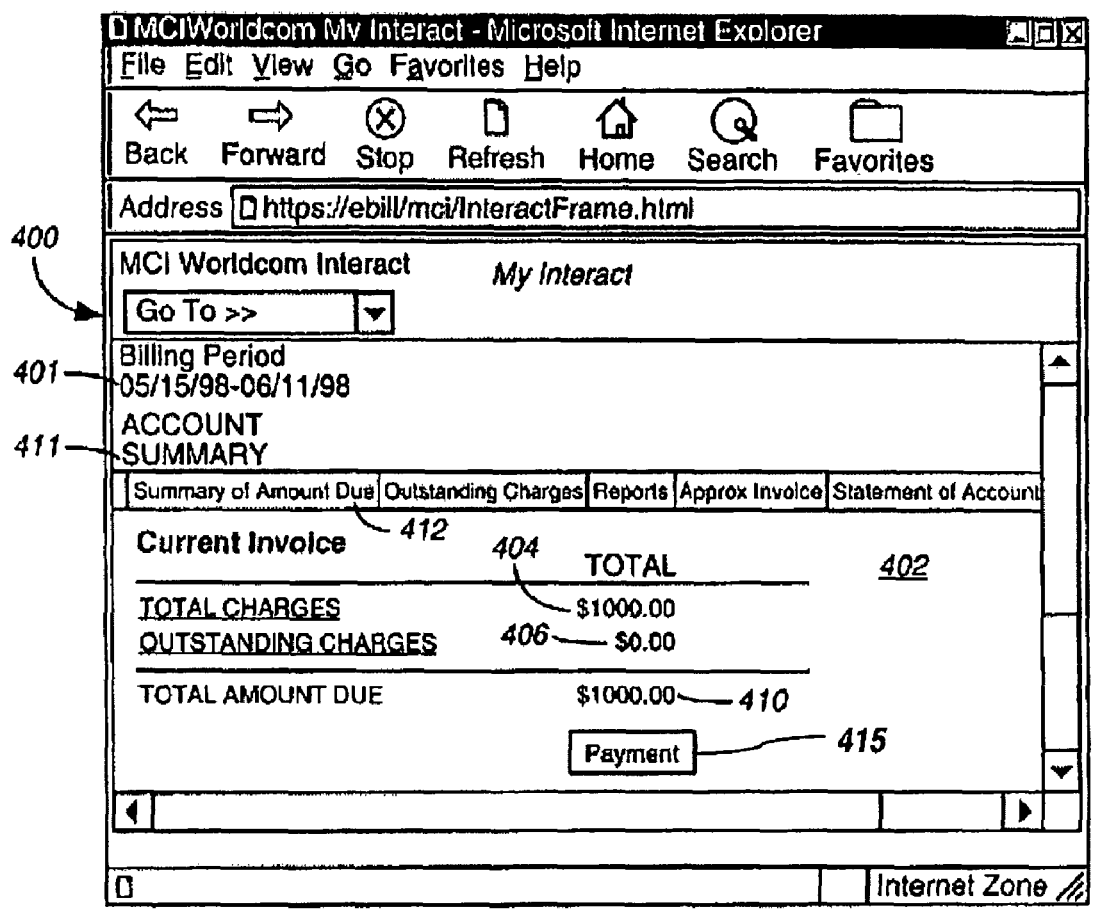
FIGS. 4(*a*)-4(*e*) are diagrams of exemplary web pages providing the users invoice/payment screens including the EPD incentive, according to an embodiment of the present invention.

FIG. 4(a) illustrates a typical "current" invoice web-based display screen 400 including HTML frame 402 generated in accordance with the e-billing system described herein. As shown is a bar 401 indicating the current billing period, the name of the account, the invoice date and number. Further provided are fields that are populated with the account data including: a total charges field 404 populated with the current invoice charges; a field 406 populated with the total outstanding charges amount (unpaid balance); and, a field 410 populated with the total amount due. A "pay now" button 415 selectable by the user is provided to initiate an EFT payment against the invoice.

Alternately, as shown in FIG. 4(a), from a menu bar 411 providing other user e-billing system options, the user may select a "pay invoice" button (not shown) for initiating payment of the invoice.

Upon selection of either the "pay now" button 415 or, the "pay invoice" button 412, an EPD home page 425 is displayed at the user browser as illustrated in FIG. 4(b). In FIG. 4(b), the EPD home page 425 includes an HTML frame 430 presenting the customer with a banner 432 explaining the EPD discount option for the customer. The frame is further populated with information 435 for enabling immediate EFT payment of the invoice by customer selection of the Pay button 440, or, make a later scheduled payment by selection of Schedule button 445. The EFT payment information is automatically populated with the bank account information, invoice date, number, total current charges, and the calculated EPD amount 437 based on the applied percentage, and, the total amount due 439 when the discount is applied. Provided in the frame 430 is a banner 447 indicating what percentage is being applied for the EPD, and which is populated with the re-calculated date 449 indicating the time period within which the EPD is effective. It is understood that this date is calculated based on the on-line invoice posting date. Furthermore, according to the invention, it is understood that the web application executing on the EBPP server (FIG. 3(c)) pre-populates the calculated EPD amount 437, the total amount due 439 and, the re-calculated date 449 depending upon the point in time when the customer has accessed the on-line invoice. For instance, if the user has accessed the on-line invoice 11 days after the posted invoice date, then that customer would not be eligible for the first tier of discount, e.g., 2% within ten (10) days of invoice date, and accordingly the EPD home screen 425 will not display the first tier EPD criteria. However, if the customer is within a second tier EPD criteria, the EPD home screen will be automatically populated with the second tier discount criteria, e.g., 1% within 20 days of invoice date, for example. This principle applies for each EPD tier when multiple discount periods are offered with the percentage of discount varying by the date payment is made.

Upon selection of the "pay now" button 440 from the EPD home page, an electronic payment confirmation home page 450 is displayed at the user browser as illustrated in FIG. 4(c). In FIG. 4(c), the e-payment confirmation page 450 includes an HTML frame 460 presenting the customer with information confirming electronic payment of that invoice including the application of the discount, i.e., EPD credit amount 462, and the payment amount with the EPD credit applied 464. It is understood that, for effecting the EPD, the customer must adhere to the following business rules: 1) customer must pay electronically within 10 days, for example, from the date the invoice was posted; 2) customer must have no outstanding charges from your previous month's invoice; and, 3) customer must pay the invoice in full.

If on the other hand, the user has selected the Schedule button 445 from the EPD home page 425, a scheduled payment page 475 is displayed at the user browser as illustrated in FIG. 4(d). In FIG. 4(d), scheduled e-payment edit page includes an HTML frame 480 that includes an entry field 486 that enables the customer to enter an EPD date, and, a banner 481 reminding the user to take advantage of the EPD discount by scheduling the payment date on a date no later than the determined discount expiration date 484 which is populated by the system. After the user enters a payment date, the user clicks a continue button 487 where a scheduled EDP confirmation screen 490 is displayed at the user browser as illustrated in FIG. 4(e).

In FIG. 4(e) the scheduled EDP confirmation screen 490. Preferably, the web application executing on the EBPP server (FIG. 3(c)) makes a determination as to whether the customer entered scheduled payment date is within the applicable EPD discount time window. If the scheduled payment date is outside the window, a banner 491 is displayed on HTML frame 492 reminding the user that the scheduled payment date was greater than the EPD discount time window, and that, the customer may reschedule the payment for prior to the determined discount expiration date 484 by returning to the schedule e-payment edit page 475 (FIG. 4(d)). Otherwise, if the user desires to maintain the payment terms without the discount, the customer enters the submit button 494. Thus, no discount will be applied as shown in the EPD field 437 which indicates no discount.

It should be understood that, besides making a determination as to whether the customer entered scheduled payment date is within the applicable EPD discount time window. The calculation is made as to whether the EPD discount is to be applied.

Figure 5:
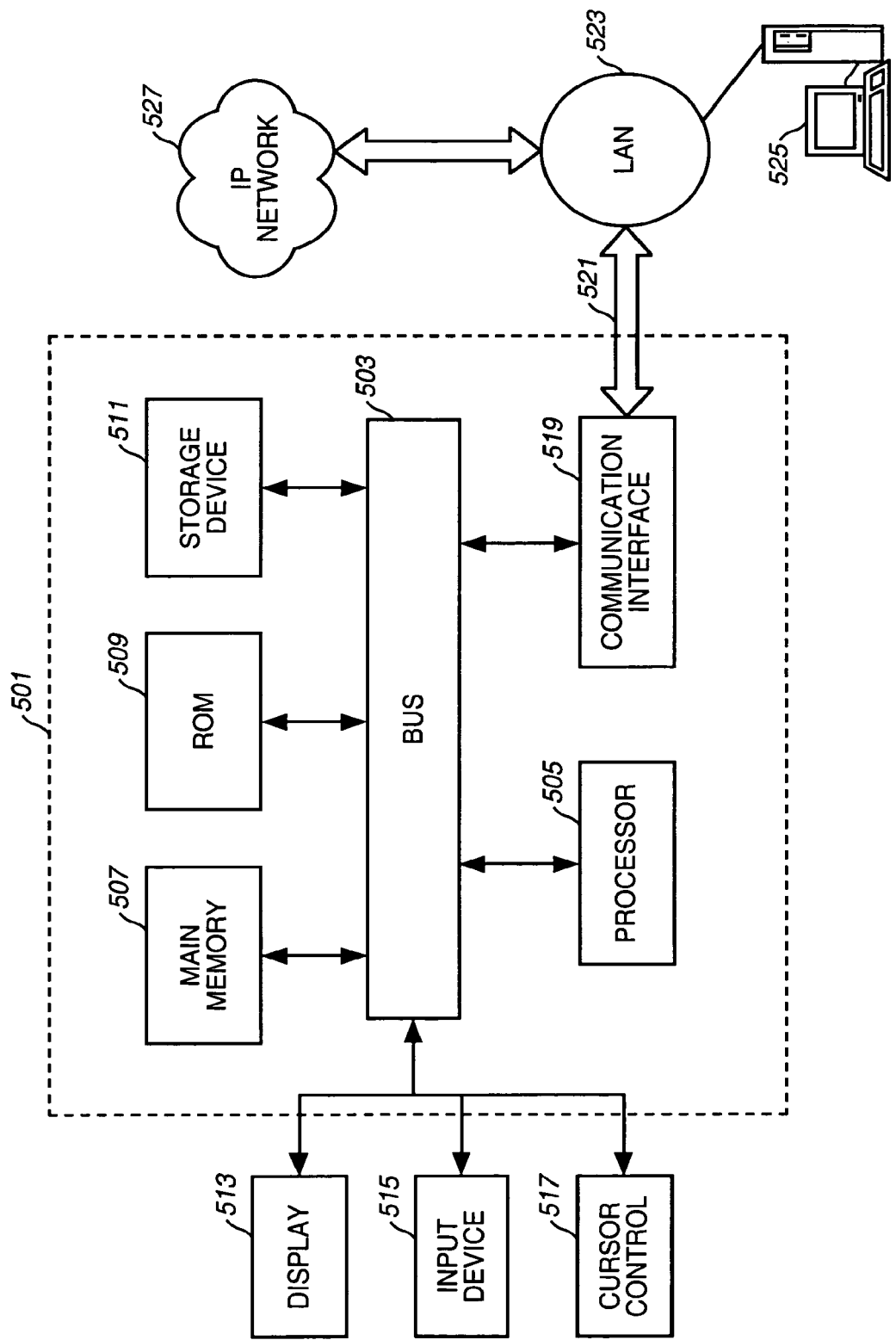
FIG. 5 is a diagram of a computer system that performs in accordance with an embodiment of the present invention.

FIG. 5 illustrates a computer system upon which an embodiment according to the present invention may be implemented. Computer system 501 includes a bus 503 or other communication mechanism for communicating information, and a processor 505 coupled with bus 503 for processing the information. Computer system 501 also includes a main memory 507, such as a random access memory (RAM) or other dynamic storage device, coupled to bus 503 for storing information and instructions to be executed by processor 505. In addition, main memory 507 may be used for storing temporary variables or other intermediate information during execution of instructions to be executed by processor 505. Computer system 501 further includes a read only memory (ROM) 509 or other static storage device coupled to bus 503 for storing static information and instructions for processor 505. A storage device 511, such as a magnetic disk or optical disk, is provided and coupled to bus 503 for storing information and instructions.

Computer system 501 may be coupled via bus 503 to a display 513, such as a cathode ray tube (CRT), for displaying information to a computer user. An input device 515, including alphanumeric and other keys, is coupled to bus 503 for communicating information and command selections to processor 505. Another type of user input device is cursor control 517, such as a mouse, a trackball, or cursor direction keys for communicating direction information and command selections to processor 505 and for controlling cursor movement on display 513.

According to one embodiment, the e-billing functions are provided by computer system 501 in response to processor 505 executing one or more sequences of one or more instructions contained in main memory 507. Such instructions may be read into main memory 507 from another computer-readable medium, such as storage device 511. Execution of the sequences of instructions contained in main memory 507 causes processor 505 to perform the process steps described herein. One or more processors in a multi-processing arrangement may also be employed to execute the sequences of instructions contained in main memory 507. In alternative embodiments, hard-wired circuitry may be used in place of or in combination with software instructions. Thus, embodiments are not limited to any specific combination of hardware circuitry and software.

Further, the functions of the e-billing system may reside on a computer-readable medium. The term "computer-readable medium" as used herein refers to any medium that participates in providing instructions to processor 505 for execution. Such a medium may take many forms, including but not limited to, non-volatile media, volatile media, and transmission media. Non-volatile media includes, for example, optical or magnetic disks, such as storage device 511. Volatile media includes dynamic memory, such as main memory 507. Transmission media includes coaxial cables, copper wire and fiber optics, including the wires that comprise bus 503. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions relating to e-billing functions remotely into its dynamic memory and send the instructions over a telephone line using a modem. A modem local to computer system 501 can receive the data on the telephone line and use an infrared transmitter to convert the data to an infrared signal. An infrared detector coupled to bus 503 can receive the data carried in the infrared signal and place the data on bus 503. Bus 503 carries the data to main memory 507, from which processor 505 retrieves and executes the instructions. The instructions received by main memory 507 may optionally be stored on storage device 511 either before or after execution by processor 505.

Computer system 501 also includes a communication interface 519 coupled to bus 503. Communication interface 519 provides a two-way data communication coupling to a network link 521 that is connected to a local network 523. For example, communication interface 519 may be a network interface card to attach to any packet switched local area network (LAN). As another example, communication interface 519 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 519 sends and receives electrical, electromagnetic or optical signals that carry digital data streams representing various types of information.

Network link 521 typically provides data communication through one or more networks to other data devices. For example, network link 521 may provide a connection through local network 523 to a host computer 525 or to data equipment operated by a service provider, which provides data communication services through a communication network 527 (e.g., the Internet). LAN 523 and network 527 both use electrical, electromagnetic or optical signals that carry digital data streams. The signals through the various networks and the signals on network link 521 and through communication interface 519, which carry the digital data to and from computer system 501, are exemplary forms of carrier waves transporting the information. Computer system 501 can transmit notifications and receive data, including program code, through the network(s), network link 521 and communication interface 519.

The techniques described herein provide several advantages over prior approaches to executing payment of bills over an on-line system. This arrangement advantageously provides an integrated e-billing system for payment and analysis of invoice information.

While the invention has been particularly shown and described with respect to preferred embodiments thereof, it will be understood by those skilled in the art that the foregoing and other changes in form and details may be made therein without departing from the spirit and scope of the invention. More specifically, the system administrative and early payment discount system described may apply to any generic applications available via the Web and is not limited to the telecommunications industry.

What is claimed is:

1. A method comprising:
 determining, by a processor, that a user account is eligible for a discount amount associated with an on-line invoice based on a criterion, wherein the criterion specifies a predetermined outstanding charge for the user account;
 applying the discount amount to the user account;
 initiating presentation, via a graphical user interface, of the discount amount to permit application of the discount amount if payment is received in advance of a due date of the invoice.

2. A method according to claim 1, further comprising:
 defining a time period for which the discount amount is valid.

3. A method according to claim 2, further comprising:
 initiating presentation, via the graphical user interface, of an expiration date derived from the time period.

4. A method according to claim 1, wherein the discount amount is based upon a percentage of the invoice, further comprising:
 determining another discount amount based upon another percentage of the invoice.

5. A method according to claim 4, further comprising:
 automatically applying either of the discount amounts based upon time of receipt of payment of the invoice.

6. A method according to claim 1, further comprising:
 initiating presentation of the invoice according to a hypertext mark-up language (HTML) format via the graphical user interface.

7. A method according to claim 1, further comprising:
 generating a notification message specifying availability of the invoice for access via a portal.

8. A method according to claim 1, further comprising:
 initiating presentation, via the graphical user interface, of a payment icon representing an electronic file transfer payment option to initiating payment of the invoice.

9. An apparatus comprising:
 at least one processor; and
 at least one memory including computer program code for one or more programs,
 the at least one memory and the computer program code configured to, with the at least one processor, cause the apparatus to perform at least the following,
 determine that a user account is eligible for a discount amount associated with an on-line invoice based on a criterion, wherein the criterion specifies a predetermined outstanding charge for the user account;
 apply the discount amount to the user account;
 initiate presentation, via a graphical user interface, of the discount amount to permit application of the discount amount if payment is received in advance of a due date of the invoice.

10. An apparatus according to claim 9, wherein the apparatus is further caused to:
 define a time period for which the discount amount is valid.

11. An apparatus according to claim 10, wherein the apparatus is further caused to:
 initiate presentation, via the graphical user interface, of an expiration date derived from the time period.

12. An apparatus according to claim 9, wherein the discount amount is based upon a percentage of the invoice, the apparatus being further caused to:
 determine another discount amount based upon another percentage of the invoice.

13. An apparatus according to claim 12, further comprising:
 automatically apply either of the discount amounts based upon time of receipt of payment of the invoice.

14. An apparatus according to claim 9, wherein the apparatus is further caused to:
 initiate presentation of the invoice according to a hypertext mark-up language (HTML) format via the graphical user interface.

15. An apparatus according to claim 9, wherein the apparatus is further caused to:
 generate a notification message specifying availability of the invoice for access via a portal.

16. An apparatus according to claim 9, wherein the apparatus is further caused to:

initiate presentation, via the graphical user interface, of a payment icon representing an electronic file transfer payment option to initiate payment of the invoice.

17. An electronic billing system comprising:

a database configured to store information representing an on-line invoice;

a processor configured to access the database and to determine that a user account is eligible for a discount amount associated with an on-line invoice based on a criterion, wherein the criterion specifies a predetermined outstanding charge for the user account, wherein the processor is further configured to apply the discount amount to the user account, and to initiate presentation, via a graphical user interface, of the discount amount to permit application of the discount amount if payment is received in advance of a due date of the invoice.

18. A system according to claim 17, wherein the processor is further configured to define a time period for which the discount amount is valid.

19. A system according to claim 18, wherein the processor is further configured to initiate presentation, via the graphical user interface, of an expiration date derived from the time period.

20. A system according to claim 17, wherein the discount amount is based upon a percentage of the invoice, and the processor is further configured to initiate presentation, via the graphical user interface, of an expiration date derived from the time period.

* * * * *